United States Patent
Yokota et al.

(10) Patent No.: US 8,825,205 B2
(45) Date of Patent: Sep. 2, 2014

(54) METHOD FOR CONTROLLING MOVEMENT OF TRAVELLING CARRIERS

(71) Applicants: Toshiaki Yokota, Shiga (JP); Kazuhiko Miyoshi, Shiga (JP); Masatsugu Kamei, Shiga (JP); Atsunobu Iseki, Shiga (JP)

(72) Inventors: Toshiaki Yokota, Shiga (JP); Kazuhiko Miyoshi, Shiga (JP); Masatsugu Kamei, Shiga (JP); Atsunobu Iseki, Shiga (JP)

(73) Assignee: Daifuku Co., Ltd. (JP)

( * ) Notice: Subject to any disclaimer, the term of this patent is extended or adjusted under 35 U.S.C. 154(b) by 0 days.

(21) Appl. No.: 13/923,107

(22) Filed: Jun. 20, 2013

(65) Prior Publication Data

US 2013/0282168 A1    Oct. 24, 2013

Related U.S. Application Data

(60) Provisional application No. PCT/JP2012/051835, filed on Jan. 27, 2012.

(30) Foreign Application Priority Data

Feb. 2, 2011    (JP) .................................. 2011-020546

(51) Int. Cl.
*B65G 43/00* (2006.01)
*B62D 65/18* (2006.01)

(52) U.S. Cl.
CPC ............... *B65G 43/00* (2013.01); *B62D 65/18* (2013.01)
USPC ......................... 700/230; 700/275; 104/88.01

(58) Field of Classification Search
USPC .................................................. 700/213, 230
See application file for complete search history.

(56) References Cited

U.S. PATENT DOCUMENTS

| | | | | |
|---|---|---|---|---|
| 6,129,025 | A | * | 10/2000 | Minakami et al. .......... 104/88.01 |
| 2005/0081736 | A1 | * | 4/2005 | Koide .......................... 104/88.01 |
| 2010/0204833 | A1 | * | 8/2010 | Lund .............................. 700/275 |

FOREIGN PATENT DOCUMENTS

| | | |
|---|---|---|
| JP | H044409 A | 1/1992 |
| JP | H06211332 A | 8/1994 |
| JP | 2001216024 A | 8/2001 |

OTHER PUBLICATIONS

International Search Report Application No. PCT/JP2012/051835 Completed: Mar. 31, 2012; Mailing Date: Mar. 27, 2012 1 page.

* cited by examiner

*Primary Examiner* — Gene Crawford
*Assistant Examiner* — Kyle Logan
(74) *Attorney, Agent, or Firm* — St. Onge Steward Johnston & Reens LLC

(57) ABSTRACT

A method for controlling movement of travelling carriers includes providing, to a rear travelling carrier approaching a work area at a high speed, current location information corresponding to distances from a measurement starting point to the rear travelling carrier and a front travelling carrier, the rear travelling carrier calculating a following distance between the front and rear travelling carriers based on the current location information, and the rear travelling carrier performing deceleration control to the operating speed based on decremental changes of the following distance.

6 Claims, 10 Drawing Sheets

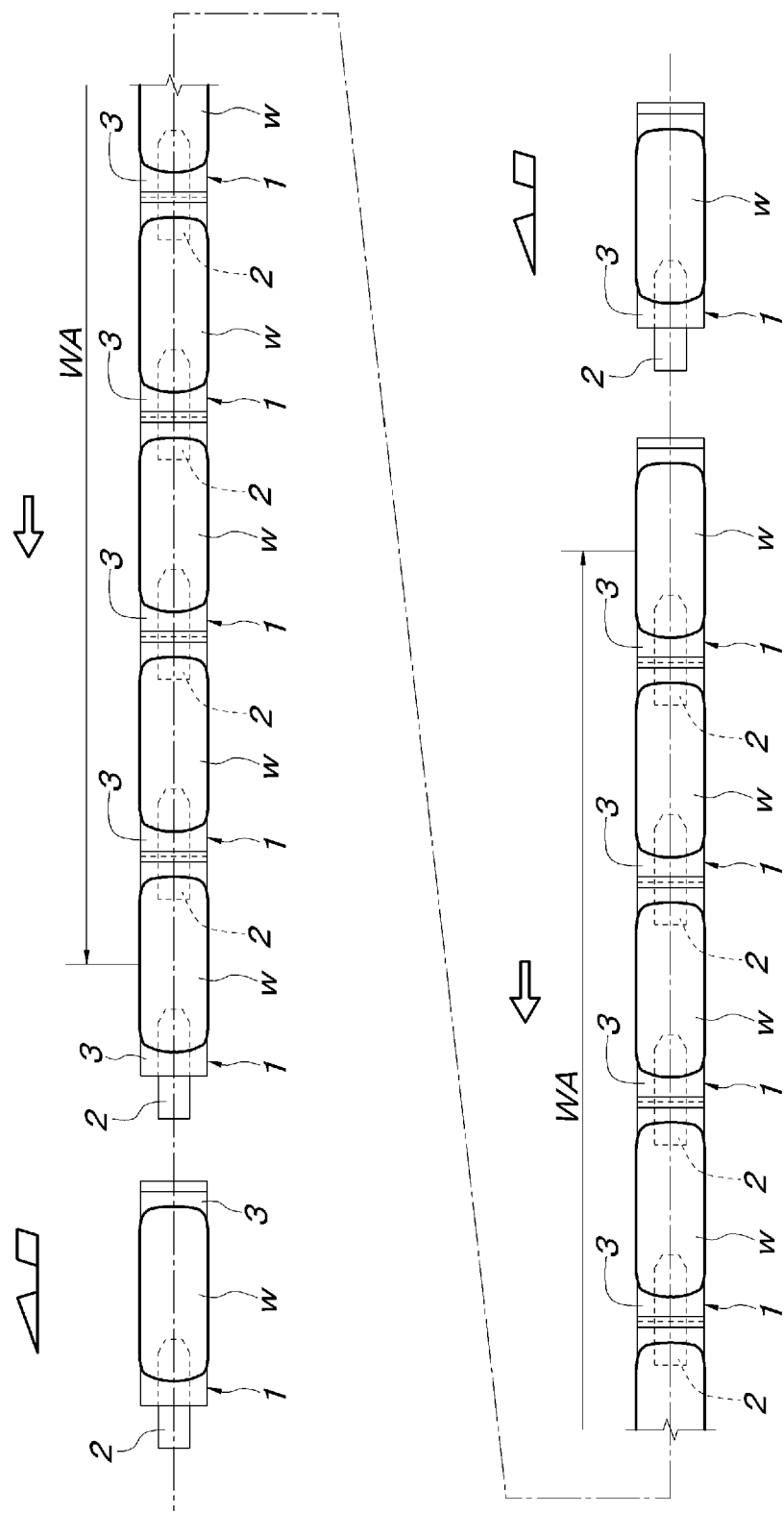

METHOD FOR CONTROLLING MOVEMENT OF TRAVELLING CARRIERS

FIELD OF THE INVENTION

The present invention relates to a method for controlling movement of variable-moving-speed and self-propelled travelling carriers at the time of being entered into a work area.

BACKGROUND OF THE INVENTION

In an automobile assembly line, a work area is used where travelling carriers loaded with vehicle bodies are moved at a constant low operating speed with respective work floors thereof being continuous in a moving direction and at the same time required operations are performed on the loaded vehicle bodies. On the occasion when variable-moving-speed and self-propelled travelling carriers are used in such a work area, the travelling carriers are driven at a high speed except for the above-described work area, whereby the number of necessary travelling carriers in the entire equipment can be reduced and conveyance efficiency in the moving path except for the work area can be increased. In that case, a rear travelling carrier needs to be automatically controlled to decelerate such that the rear travelling carrier approaching the work area at a high speed is decelerated with respect to a front travelling carrier moving near an entrance of the work area at an operating speed and the moving speed of the rear travelling carrier is exactly reduced to the above-described operating speed when the rear travelling carrier is docked with the front travelling carrier. A known deceleration control method applicable to such a case is, although prior art documents thereof cannot be disclosed, such that a distance with the front travelling carrier is detected by a distance sensor and the rear travelling carrier is decelerated based on information about the detected distance with the front travelling carrier.

SUMMARY OF THE INVENTION

In the method for controlling movement of travelling carriers through the use of the above distance sensor, not only is the distance sensor itself which is capable of detecting changes in distance with the front travelling carrier with high accuracy very expensive, but also it is difficult to quickly adapt detected distance values to changes in actual distance with high accuracy without a time lag. Furthermore, the travelling carrier itself is also subjected to restrictions in structure to improve the detection accuracy of the distance sensor, thereupon being unpractical.

Means for Solving the Problems

Accordingly, the present invention proposes a method for controlling movement of travelling carriers capable of solving the foregoing conventional problems. Described with reference symbols in parentheses used in the description of an embodiment described below in order to facilitate understanding of the relationship with the embodiment below, a method for controlling movement of travelling carriers in accordance with the first aspect of the present invention in conveying equipment configured such that a work area (WA) where variable-moving-speed and self-propelled travelling carriers (1) move on their own at a fixed low operating speed (VL) while keeping a state of being continuous motion in a moving direction is set within a moving path for the travelling carriers (1) and that the travelling carriers (1) move to approach the work area (WA) at a high speed, the method is characterized by providing each of the travelling carriers (1) with data communication means (13 and 14) to perform data communication between front and rear adjacent travelling carriers (1), setting a measurement starting point (P1) upstream of the work area (WA) in the moving path, giving current location information corresponding to moving distances (L1Y and L1Z) from the measurement starting point (P1) to a rear travelling carrier (1Z) approaching the work area (WA) at a high speed and a front travelling carrier (1Y) thereahead moving at the operating speed (VL), having the rear travelling carrier (1Z) calculate a distance with the front travelling carrier (1Y) based on its own current location information and the current location information of the front travelling carrier (1Y) having been received via the data communication means (13 and 14), having the rear travelling carrier (1Z) carry out deceleration control based on decremental changes of the distance, and controlling the rear travelling carrier (1Z) such that the rear travelling carrier (1Z) moves on its own at the operating speed (VL) at a time of docking completion which is when the distance reaches a set value.

Effects of the Invention

According to the foregoing method of the present invention, information on the distance with the immediately preceding front travelling carrier is not given by the distance sensor attached to the rear travelling carrier subject to the deceleration control. Therefore, a variety of problems conceived when the distance sensor is used as described above can be solved. Furthermore, the rear travelling carrier approaching the work area at a high speed can be automatically controlled to decelerate in accordance with shortening of the distance (interval) with the immediately preceding front travelling carrier. When the rear travelling carrier approaches a set value (is docked) with respect to the front travelling carrier, the rear travelling carrier can be entered into the work area at the same fixed low operating speed as the front travelling carrier.

It is noted that the rear travelling carrier having been docked can be driven in the work area while the speed control is continued so as to keep the interval with the front travelling carrier at the set value. Further, when the rear travelling carrier is docked with the front travelling carrier at the entrance of the work area, the rear travelling carrier and the front travelling carrier can be coupled by a coupling means automatically coupling front and rear travelling carriers together. In the work area, the coupled travelling carriers can also be driven at the operating speed by a self-propelled force of each travelling carrier or another propelling means.

However, the rear travelling carrier (1Z) after the docking completion can terminate speed control based on the distance between the both front and rear travelling carriers (1Y and 1Z), and all of the travelling carriers (1) within the work area (WA) can be moved on their own at the operating speed (VL) without coupling each other. According to this control method, an area of calculating the distance between the both front and rear travelling carriers is shortened as compared with the case of continuing speed control based on the distance between the front and rear travelling carriers throughout a long area including the entire length of the work area. Consequently, highly accurate control can be facilitated.

The data communication means between the front and rear travelling carriers (1Y and 1Z) may be any type of means. However, the use of optical communication means employing a photo transmitter-receiver as the data communication means (13 and 14) allows not only inexpensive implementation but also easy maintenance, which is practical.

Additionally, an obstacle sensor (12) detecting an obstacle ahead is provided to each of the travelling carriers (1), and the deceleration control based on decremental changes of the distance with the front travelling carrier (1Y) is carried out from a time when the rear travelling carrier (1Z) approaching the work area (WA) at a high speed detects the front travelling carrier (1Y) by the obstacle sensor (12), whereby the length of the area of carrying out the deceleration control based on decremental changes of the distance with the front travelling carrier (1Y) can be shortened to the bare minimum at all times. Thereby, highly accurate control can be facilitated.

BRIEF DESCRIPTION OF THE DRAWINGS

FIG. 2 is a plan view explaining the work area.

DETAILED DESCRIPTION OF THE INVENTION

Figure 1A:
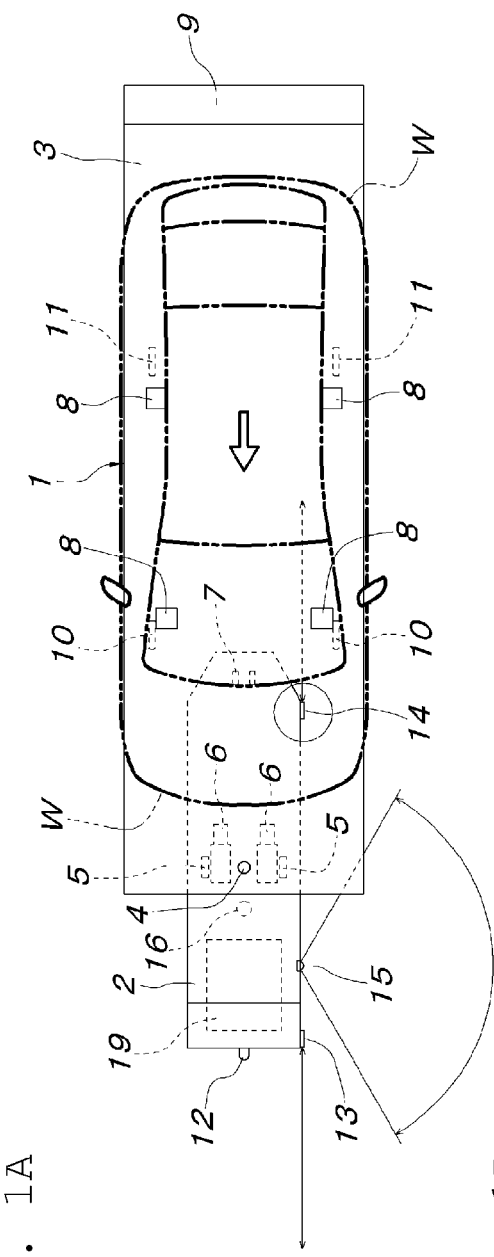
FIG. 1A is a plan view of a travelling carrier and FIG. 1B is a side view showing a moving state of respective travelling carriers in a work area.
Figure 1B:
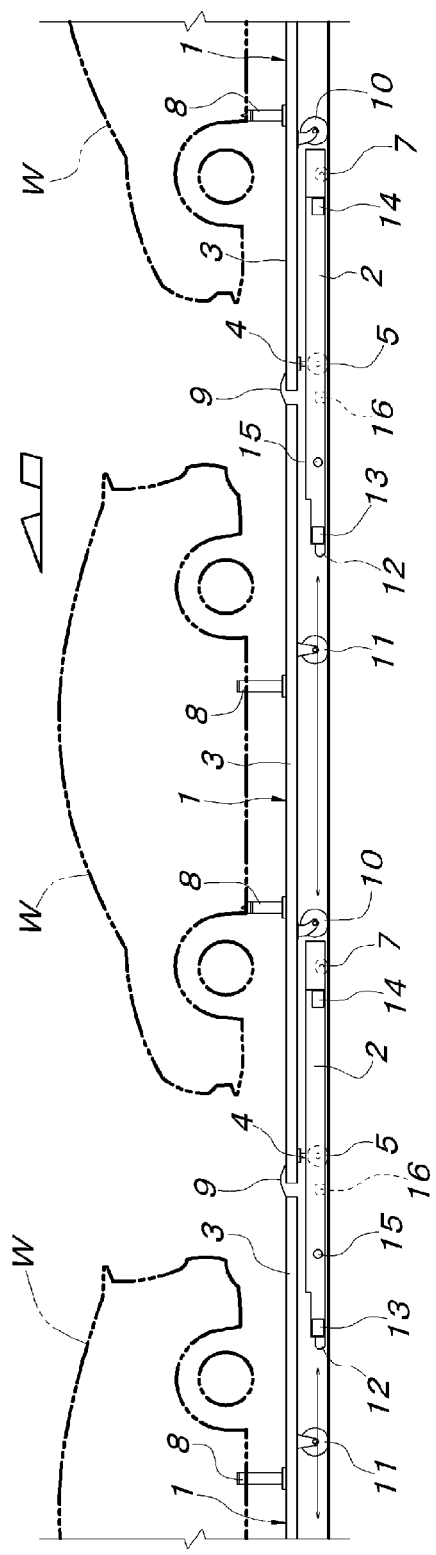

As shown in FIG. 1, a travelling carrier 1 employed in this embodiment consists of a combination of a self-propelled tractor 2 and a conveying carriage 3 towed by the tractor 2. The tractor 2 has such a low-floor structure that the vehicle height thereof is low enough to move under the conveying carriage 3. While a rear half of the tractor 2 is entered under a front end of the conveying carriage 3, the vicinity of a longitudinal center of the tractor 2 and the vicinity of a width center near the front end of the conveying carriage 3 are connected by a vertical connecting shaft 4 so as to be relatively rotatable about the vertical connecting shaft 4. The tractor 2 is provided with a pair of left and right driving wheels 5 positioned at both lateral sides of the vertical connecting shaft 4, a pair of left and right motors 6 respectively driving and rotating the both driving wheels 5 in any of normal and reverse directions, and a rear wheel 7 positioned at the width center near the rear end. The paired left and right driving wheels 5 are fixed in the straight forward direction, and the rear wheel 7 comprises a caster wheel.

The conveying carriage 3 supports an object to be conveyed (a vehicle body or the like) W with a plurality of conveyed object supporting jigs 8 installed upright on a surface (a work floor) of the carriage. The conveying carriage 3 has a rear side from which a cover plate 9 covering a front side of a rear adjacent conveying carriage 3 in the work area extends rearward. The conveying carriage 3 is also provided with a pair of left and right front wheels 10 provided at positions not to interfere with relative rotation of the tractor 2 about the vertical connecting shaft 4 and consisting of caster wheels, and a pair of left and right rear wheels 11 fixed in the straight forward direction.

The tractor 2 has a front end provided with an obstacle sensor 12 detecting an obstacle coming within a fixed forward distance range. Front-rear oriented optical communication devices 13 and 14 using photo transmitter-receivers are attached on front and rear ends of a lateral surface of the tractor 2. A sideways oriented wide-range optical communication device 15 using a photo transmitter-receiver is attached on an intermediate position of the lateral surface of the tractor 2. A fixed position detecting sensor 16 detecting a marker arranged on the floor surface is attached on a bottom surface of the tractor 2. The front-rear oriented optical communication devices 13 and 14 perform, for example, data communication through a 16-bit light with other structurally identical front-rear oriented optical communication devices 13 and 14 of tractors 2 of travelling carriers 1 positioned within fixed forward and rearward distance ranges of the travelling carrier 1 in a straight path. The sideways oriented wide-range optical communication device 15 performs, for example, data communication through an 8-bit light with a structurally identical ground-based wide-range optical communication device positioned within fixed forward and rearward ranges (for example, forward and rearward ranges of 60 degrees respectively) in the moving direction of the travelling carrier 1 when viewed from the wide-range optical communication device 15.

In a circulating moving path for the above-configured travelling carriers 1, a work area WA is set in which a plurality of travelling carriers 1 move straight forward while work floors which are surfaces of conveying carriages 3 of the carriers 1 are continuous, as shown in FIG. 2. In the work area WA, a front half of the tractor 2 projecting forward from the front end of each conveying carriage 3 is entered under a rear end of a conveying carriage 3 of an immediately preceding travelling carrier 1, and the cover plate 9 extending rearward from the rear side of each conveying carriage 3 covers a front side of a conveying carriage 3 of an immediately following travelling carrier 1. Hereinafter, movement control at the time when the travelling carriers 1 enter the work area WA will be described based on FIGS. 3 to 5A. Movement control at the time when the travelling carriers 1 leave the work area WA will be described based on FIGS. 5B to 6. In FIGS. 3 to 6, the travelling carrier 1 composed of the tractor 2 and the conveying carriage 3 is illustrated as simplified into an oblong box-shape in plan. To enhance legibility of the drawings, the fixed position detecting sensor 16 on the bottom surface of the conveying carriage 3 is illustrated on the left surface of the travelling carrier 1, and the optical communication devices 13 and 14 and the wide-range optical communication device 15 are illustrated on the right surface of the travelling carrier 1, laterally opposite to the positions shown in FIG. 1 and FIG. 2.

As shown in FIGS. 3 to 5A, a measurement starting point P1 is set at an upstream fixed position away from the work area WA for a fixed distance, and a docking check position P2 is set around the entrance of the work area WA. At these measurement starting point P1 and the docking check position P2, a marker to be detected by the fixed position detecting sensor 16 provided to the passing travelling carrier 1 is provided on the floor surface or the like. A ground-based wide-range optical communication device 17 performing data communication with the wide-range optical communication device 15 provided to the passing travelling carrier 1 is provided around the entrance of the work area WA. The ground-based wide-range optical communication device 17 can also perform data communication with the wide-range optical communication device 15 passing within fixed forward and rearward ranges (for example, within forward and rearward ranges of 60 degrees respectively) in the moving direction of the travelling carrier 1 when the moving path for the travelling carrier 1 is viewed from the ground-based wide-range optical communication device 17, similar to the wide-range optical communication device 15.

Figure 5A:
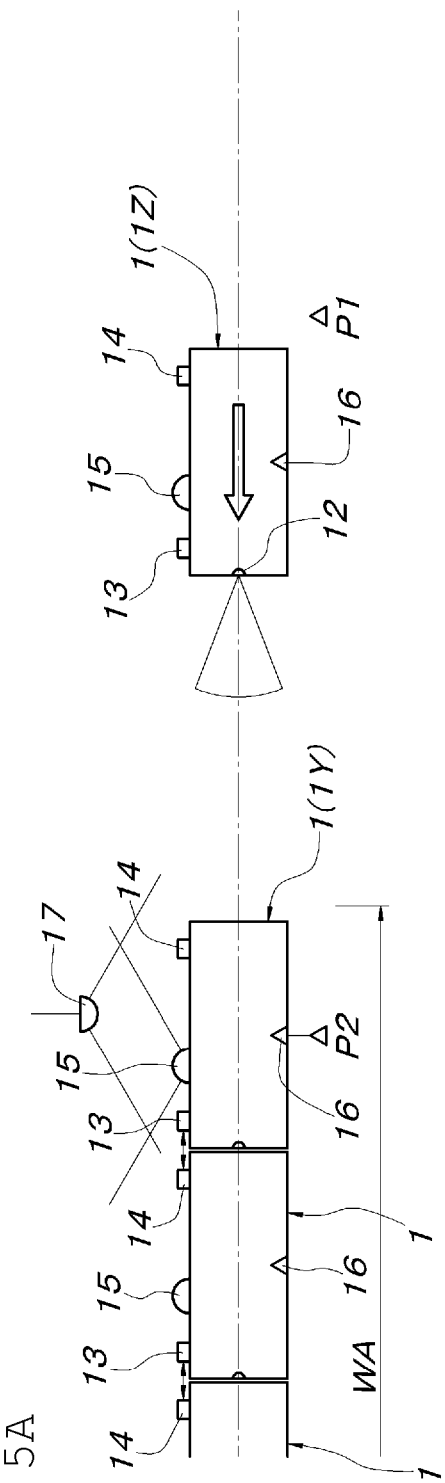
FIG. 5A is a plan view showing the final stage of the same speed control and FIG. 5B is a plan view showing the first stage of speed control over the travelling carriers at an exit side of the work area.
Figure 5B:
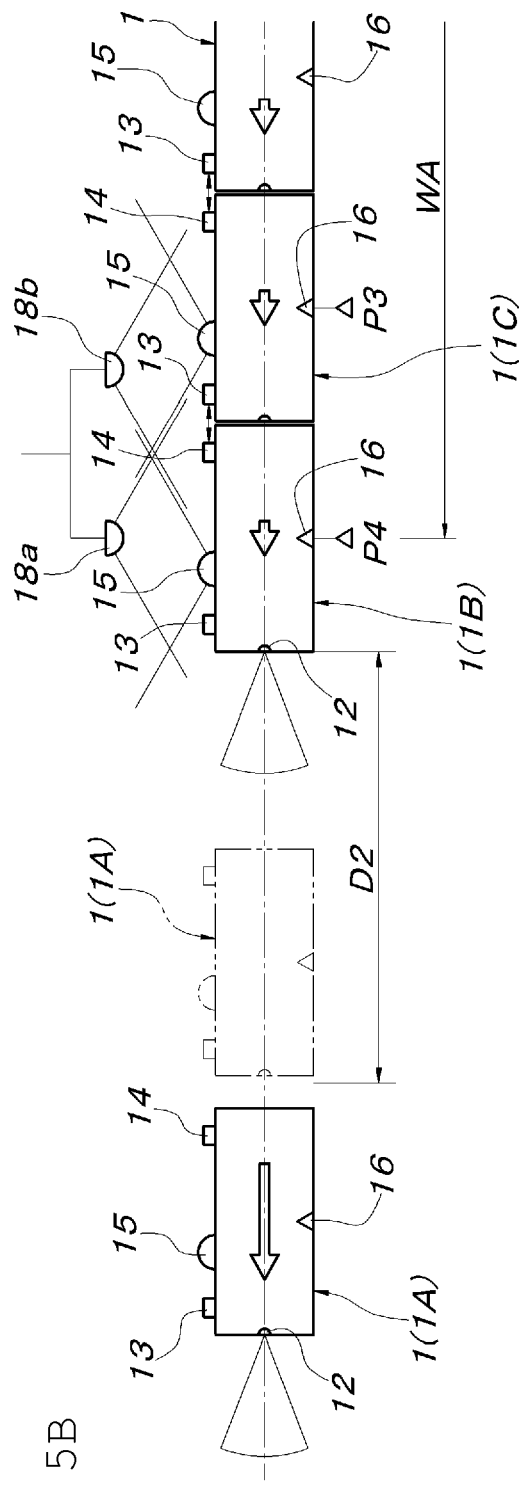
Figure 6A:
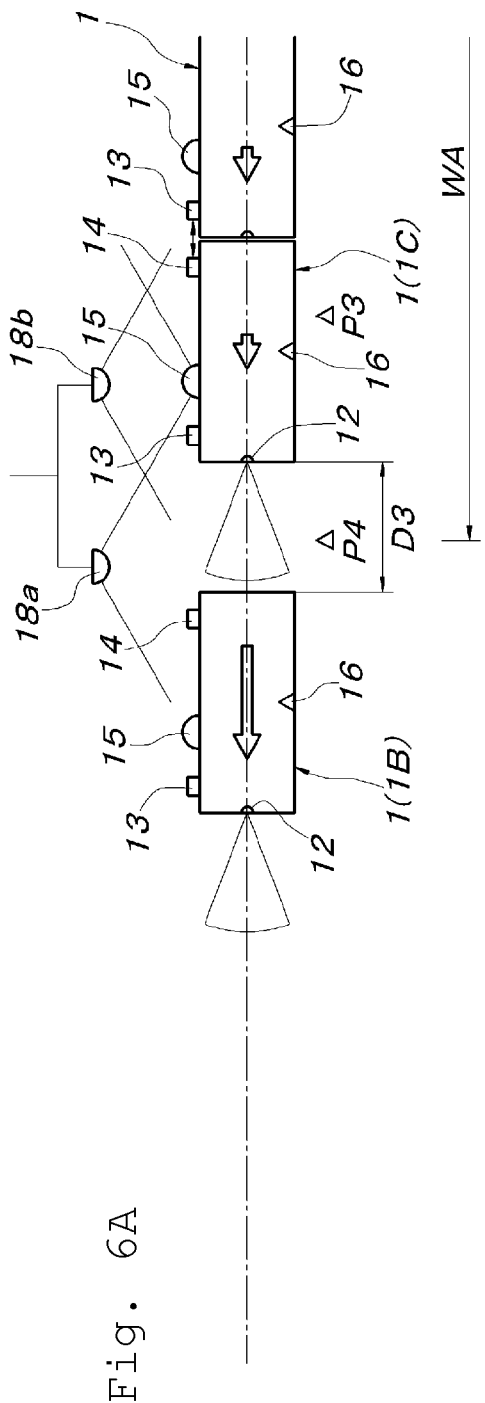
FIG. 6A is a plan view showing the second stage of the same speed control and FIG. 6B is a plan view showing a state where an abnormal condition occurs at the second stage.
Figure 6B:
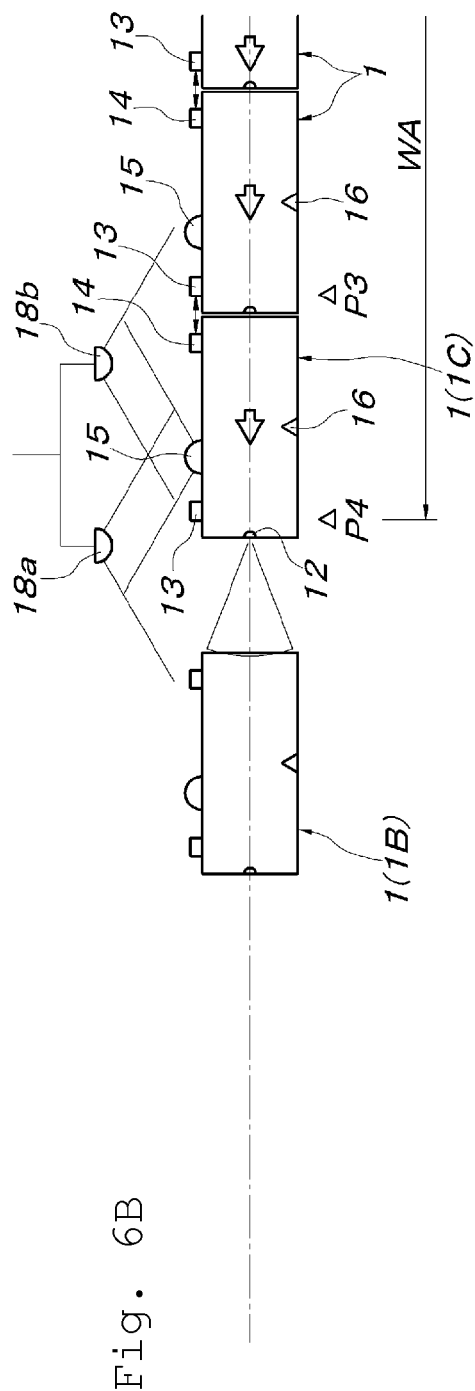

As shown in FIGS. 5B to 6, ground-based wide-range optical communication devices 18a and 18b performing data communication with the wide-range optical communication device 15 provided to the passing travelling carrier 1 are provided around the exit of the work area WA. These ground-based wide-range optical communication devices 18a and 18b can also perform data communication with the wide-range optical communication device 15 passing within fixed forward and rearward ranges (for example, forward and rearward ranges of 60 degrees respectively) in the moving direction of the travelling carrier 1 when the moving path for the travelling carrier 1 is viewed from each of the ground-based wide-range optical communication devices 18a and 18b, similar to the wide-range optical communication device 15. In the drawings, two identical ground-based wide-range optical communication devices 18a and 18b connected in parallel are used to expand the entire communication area in the moving direction of the travelling carrier 1. However, the number of wide-range optical communication devices used is not restricted. As long as the communication area of one wide-range optical communication device is sufficiently wide, the ground-based wide-range optical communication device can be composed of one wide-range optical communication device. Around the exit of the work area WA, a final process check position P4 and a check position before the final process P3 are set at an interval equal to the entire length of one travelling carrier 1. At the two check positions P3 and P4, a marker to be detected by the fixed position detecting sensor 16 provided to the passing travelling carrier 1 is provided on the floor surface or the like. The whole communication area of the two ground-based wide-range optical communication devices 18a and 18b is wide enough to perform data communication with at least the wide-range optical communication devices 15 of front and rear two travelling carriers 1 located at the two check positions P3 and P4 respectively.

A moving speed set for each of the travelling carriers 1 moving on their own within the work area WA in the continuous state as described above is such a fixed low operating speed VL that a worker can carry out operations on an object to be conveyed W having been loaded while safely walking on each work floor of the travelling carrier 1 (conveying carriage 3). In a situation where the travelling carriers 1 are arranged continuously within the entire work area WA, if a movement permission signal at the operating speed is sent, by an action of the ground-based control device, from the ground-based wide-range optical communication devices 18a and 18b provided around the exit of the work area WA, the movement permission signal is transmitted to at least front and rear two travelling carriers 1 located around the exit of the work area WA via the wide-range optical communication devices 15 of the travelling carriers 1. The movement permission signal having been transmitted to the travelling carriers 1 located around the exit of the work area WA is transmitted sequentially to the upstream to all of the travelling carriers 1 within the work area WA via the both front and rear optical communication devices 13 and 14 provided to each travelling carrier 1. The movement permission signal having reached the tail end travelling carrier 1 located around the entrance of the work area WA is in turn transmitted downstream via the both front and rear optical communication devices 13 and 14 provided to each travelling carrier 1. The movement permission signal is then returned to the ground-based control device from the wide-range optical communication device 15 of the travelling carrier 1 located around the exit of the work area WA via the ground-based wide-range optical communication devices 18a and 18b. A relay transmission of the movement permission signal in a unit of making a round trip among all of the travelling carriers 1 within the work area WA is configured to be repeated.

As shown in FIG. 1, each travelling carrier 1 is installed with a control device 19 in the tractor 2 thereof. This control device 19 controls the foregoing relay transmission of the movement permission signal. The control device 19 of the travelling carrier 1 relaying the movement permission signal also controls the paired left and right motors 6 based on the relaying movement permission signal so as to drive the travelling carrier 1 straight forward at the foregoing operating speed VL. Consequently, all of the travelling carriers 1 within the work area WA move straight forward while keeping the foregoing operating speed VL.

When the sending of the movement permission signal from the ground-based wide-range optical communication devices 18a and 18b is cut off by the ground-based control device, the movement permission signal is stopped to be transmitted to all of the travelling carriers 1 within the work area WA. At that moment, the control device 19 of each travelling carrier 1 stops the motors 6 based on no reception of the movement permission signal. Therefore, all of the travelling carriers 1 within the work area WA come to a stop on the spot. On the occasion when an abnormal condition subject to an emergency stop occurs to a specific travelling carrier 1 within the work area WA, the control device 19 of the specific travelling carrier 1 automatically stops the relay of the movement permission signal between the front and rear travelling carriers 1. As a result, the relay transmission of the movement permission signal to be returned to the ground-based control device is cut off. Based on this situation, the ground-based control device suspends the sending of the movement permission signal. As a result, the movement permission signal is not transmitted to all of the travelling carriers 1 within the work area WA, and all of the travelling carriers 1 within the work area WA come to a stop on the spot likewise. The tail end travelling carrier 1 located around the entrance of the work area WA does not carry out the stop control due to not receiving the downstream movement permission signal from the rear travelling carrier 1 based on the determination that the carrier 1 itself is the tail end travelling carrier 1. The tail end travelling carrier 1 reversely transmits the movement permission signal having been received from the immediately preceding travelling carrier 1 to the downstream direction.

Figure 3A:
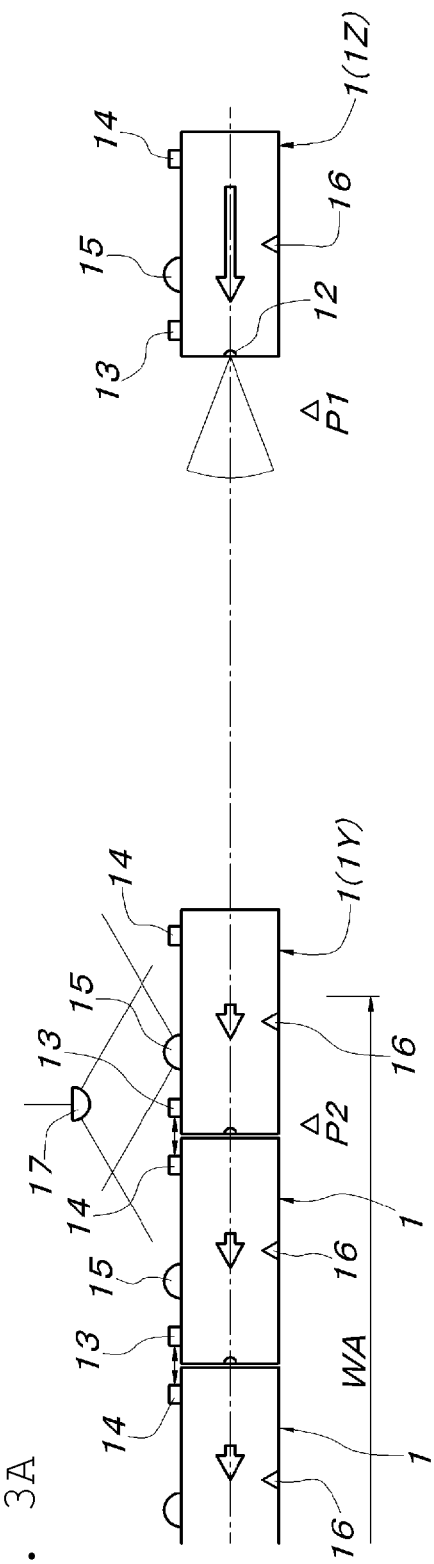
FIG. 3A is a plan view showing the first stage of speed control over the travelling carriers at an entrance side of the work area and FIG. 3B is a plan view showing the second stage of the same speed control.

Next, movement control over the travelling carrier 1 entering the work area WA will be described based on FIGS. 3 to 5A, FIG. 7, and FIG. 8. Given that the tail end travelling carrier 1 moving around the entrance of the work area WA at the operating speed VL is referred to as a front travelling carrier 1Y and a rear travelling carrier 1Z immediately after the front travelling carrier 1Y is moving toward the work area WA at a high speed VH as shown in FIG. 3A, the rear travelling carrier 1Z continues to move at a high speed VH on condition that the obstacle sensor 12 thereof detects no obstacles in a detection area ahead. If the obstacle sensor 12 detects any obstacle in the detection area ahead, the control device 19 automatically carries out deceleration and stop control in accordance with a preprogrammed deceleration and stop control program at the time of obstacle detection.

Figure 3B:
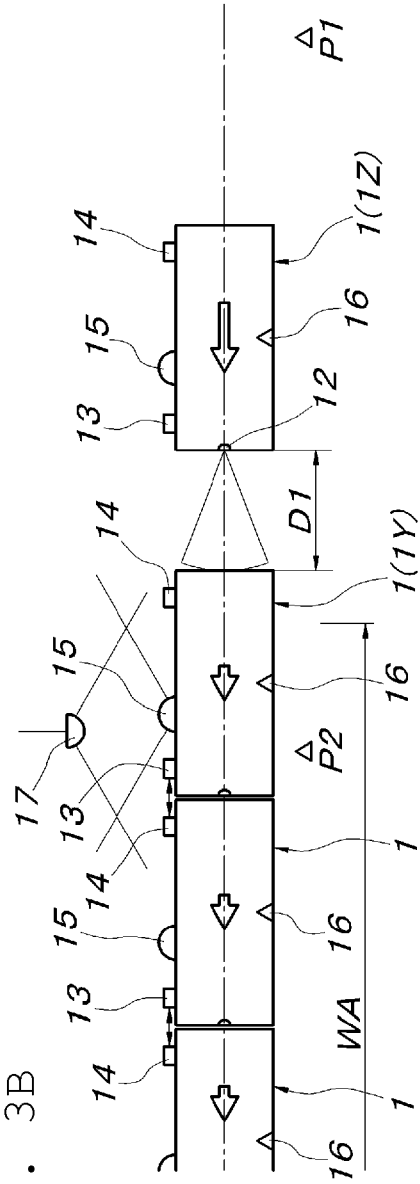
Figure 7:
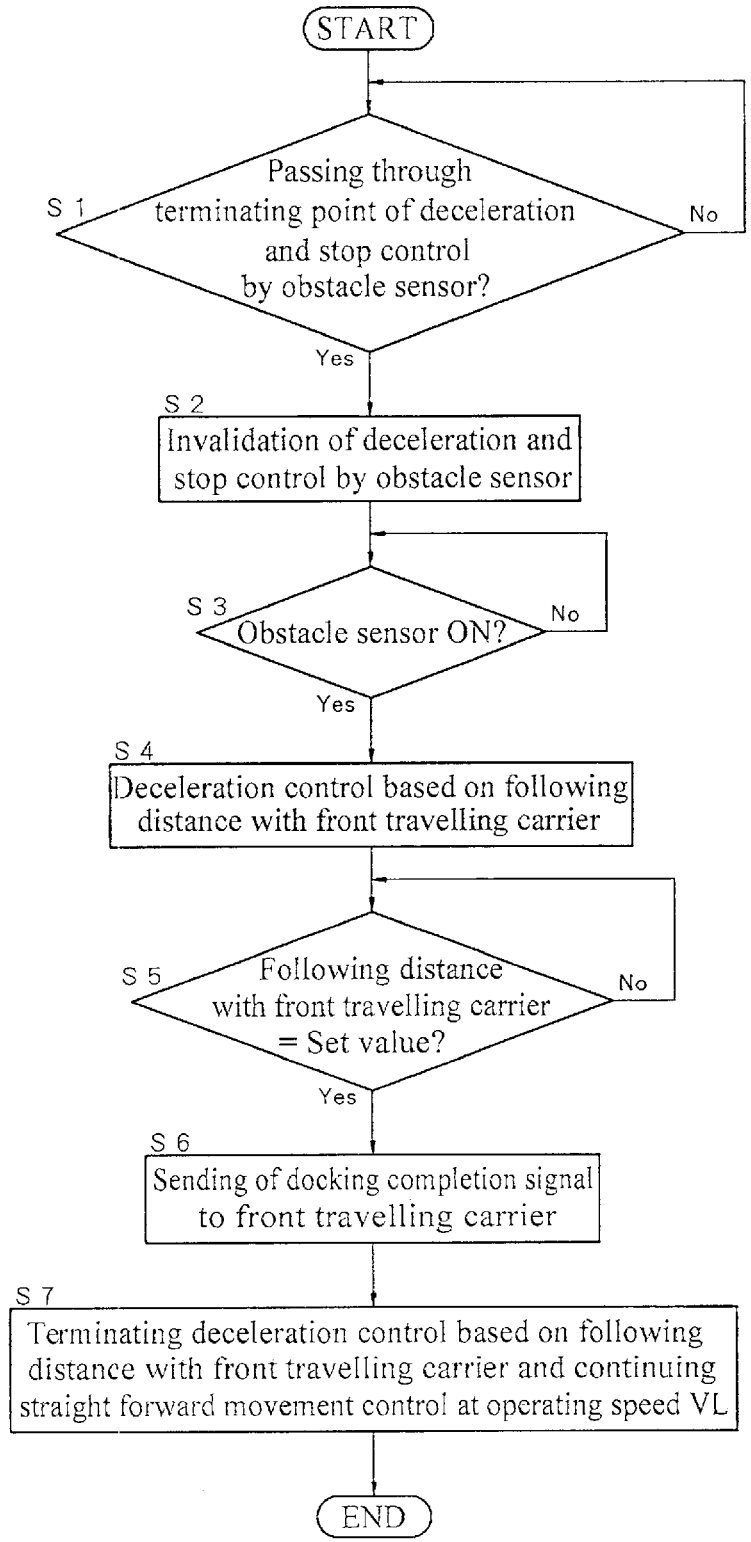
FIG. 7 is a flow chart explaining the control when a travelling carrier moving at a high speed is entered into the work area.

At the point when the rear travelling carrier 1Z passes through a fixed position at a fixed upstream distance from the work area WA (FIG. 7—S1), for example, the point when the rear travelling carrier 1Z passes through the measurement starting point P1 or another fixed position having been set separately from the measurement starting point P1, the deceleration and stop control program at the time of obstacle detection by the obstacle sensor 12 is invalidated (FIG. 7—S2). When the rear travelling carrier 1Z approaches an obstacle detection maximum following distance D1 where the obstacle sensor 12 detects the front travelling carrier 1Y as shown in FIG. 3B, the deceleration control for docking is started. That is, when the obstacle sensor 12 of the rear travelling carrier 1Z detects the front travelling carrier 1Y as an obstacle (FIG. 7—S3), the deceleration and stop control program at the time of obstacle detection executed in the normal movement is not executed, and the deceleration control based on the following distance with the front travelling carrier 1Y is started according to a detection signal ON of the obstacle sensor 12 (FIG. 7—S4).

Figure 4A:
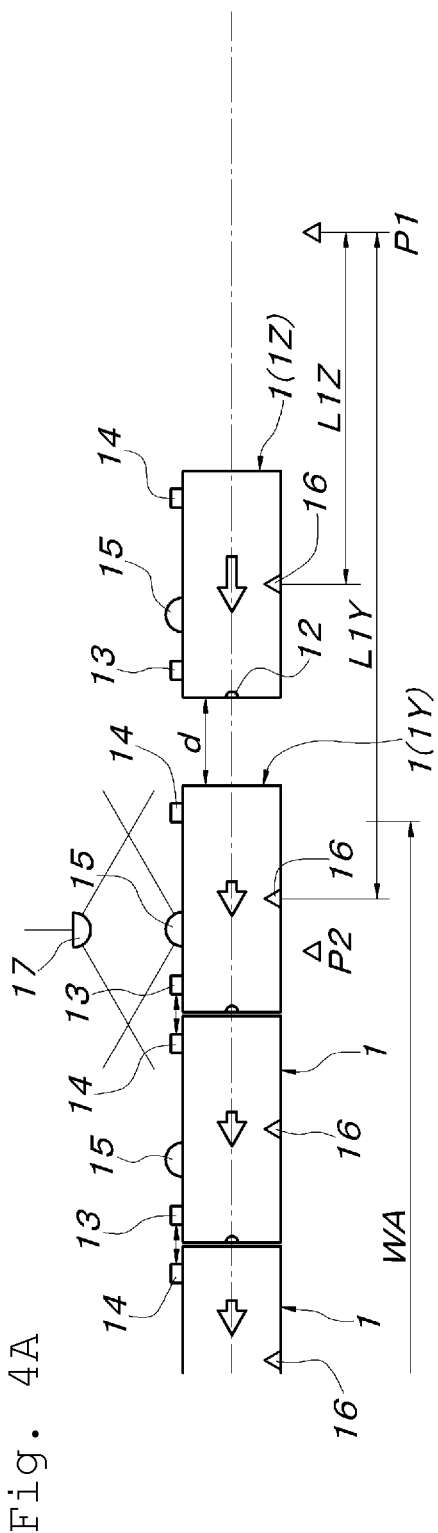
FIG. 4A is a plan view showing the third stage of the same speed control and FIG. 4B is a plan view showing the fourth stage of the same speed control.

As shown in FIG. 4A, the front and rear travelling carriers 1Y and 1Z have current location information corresponding to moving distances L1Y and L1Z from respective points of passing through the measurement starting point P1 (points when the fixed position detecting sensors 16 detect the ground-based marker provided at the measurement starting point P1). Specifically, for example, outgoing pulses of a pulse encoder synchronized with rotation of the driving wheel 5 are counted and added from the point of passing through the measurement starting point P1 by an operation function which the control device 19 has. The count value incremented proportional to the moving distance of the travelling carrier 1 can be given as the current location information. The control device 19 of the front travelling carrier 1Y transmits its operating current location information to the rear travelling carrier 1Z via the optical communication devices 13 and 14. The control device 19 of the rear travelling carrier 1Z performs a comparison operation between its operating current location information for the rear travelling carrier 1Z and the received current location information of the front travelling carrier 1Y, and obtains a following distance d with the front travelling carrier 1Y. The motors 6 are controlled in response to decremental changes of the following distance d to decelerate the rear travelling carrier 1Z. The rear travelling carrier 1Z is controlled to decelerate so as to be decelerated to the operating speed VL (FIG. 7—S5) when the following distance d having been calculated reaches a set value which is preset as a docking distance (FIG. 7—S5).

Figure 4B:
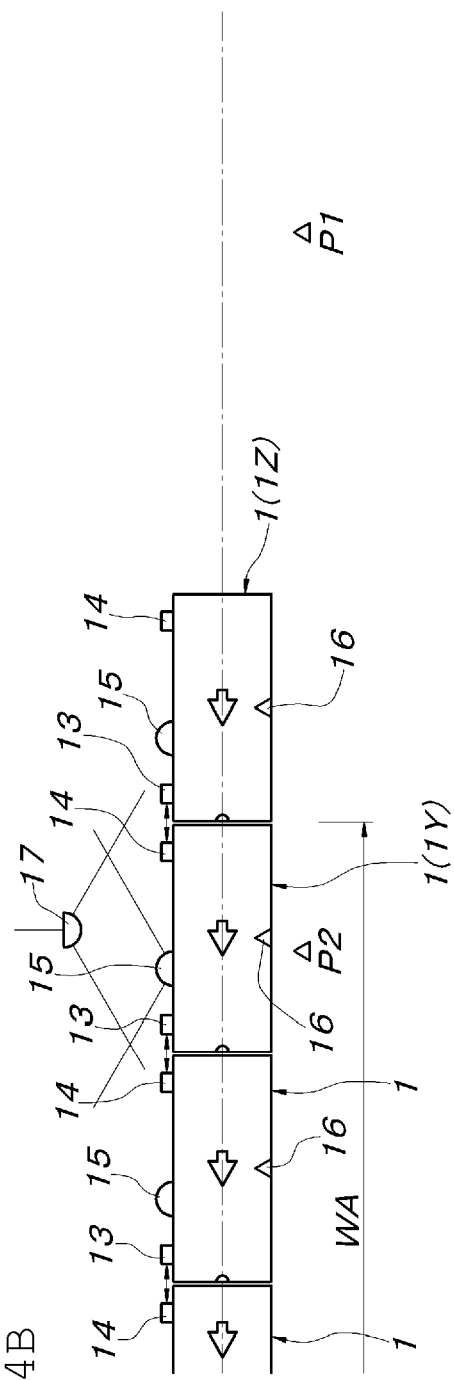

Once the rear travelling carrier 1Z approaches the intended docking distance with respect to the front travelling carrier 1Y by the foregoing deceleration control and is brought into a docking completion state of moving at the same operating speed VL as the front travelling carrier 1Y as shown in FIG. 4B, a docking completion signal is sent to the front travelling carrier 1Y via the optical communication devices 13 and 14 (FIG. 7—S6). The deceleration control based on the following distance is terminated, and the movement at the operating speed VL is continued as it is (FIG. 7—S7).

Figure 8:
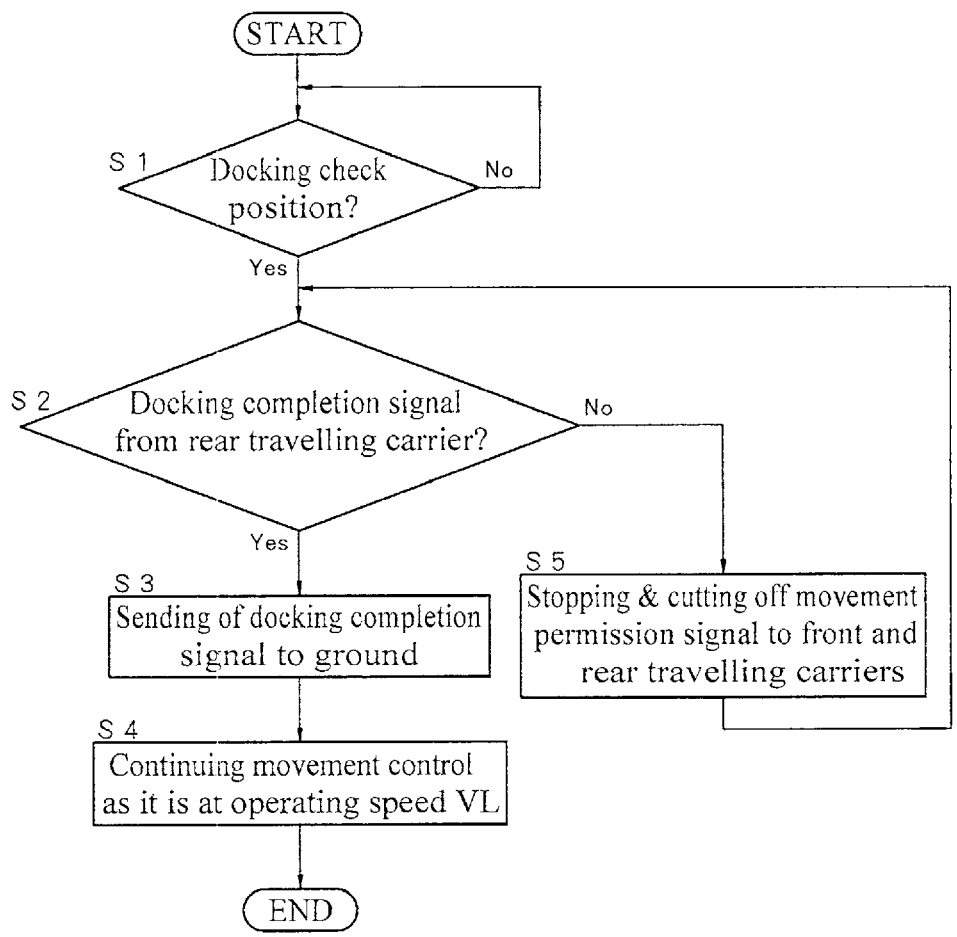
FIG. 8 is a flow chart explaining the control over the tail end travelling carrier in the work area.

The front travelling carrier 1Y does not reach the docking check position P2 yet at the time of the docking completion as shown in FIG. 4B. If the front travelling carrier 1Y already receives the docking completion signal from the rear travelling carrier 1Z (FIG. 8—S2) when reaching the docking check position P2 (FIG. 8—S1), the docking completion signal is sent from the wide-range optical communication device 15 to the ground-based control device through the ground-based wide-range optical communication device 17 (FIG. 8—S3) and the movement at the operating speed VL is continued as it is (FIG. 8—S4). After that, the relay transmission of the movement permission signal as described above is carried out with the rear travelling carrier 1Z as the tail end travelling carrier 1. All of the travelling carriers 1 within the work area WA including the rear travelling carrier 1Z come to move at the operating speed VL for maintaining the continuous state (the docked state).

If the front travelling carrier 1Y reaches the docking check position P2 before the rear travelling carrier 1Z completes the docking with the front travelling carrier 1Y, the stop control is executed on the spot and the relaying action of the movement permission signal is canceled (FIG. 8—S5). As a result, the relay transmission of the movement permission signal to all of the travelling carriers 1 within the work area WA is suspended, and the sending of the movement permission signal from the ground-based wide-range optical communication devices 18a and 18b at the exit of the work area WA is stopped. Therefore, all of the travelling carriers 1 within the work area WA come to a stop and wait. This situation is informed of the ground-based control device from the wide-range optical communication device 15 of the stopping and waiting front travelling carrier 1Y via the ground-based wide-range optical communication device 17.

The rear travelling carrier 1Z approaches the obstacle detection maximum following distance D1 with respect to the stopping and waiting front travelling carrier 1Y, is subjected to the deceleration control based on the following distance described above, and completes being docked with the stopping and waiting front travelling carrier 1Y. Then, the completion of docking is informed of the ground-based control device from the stopping and waiting front travelling carrier 1Y via the wide-range optical communication device 15 and the ground-based wide-range optical communication device 17. The ground-based control device sends the movement permission signal to the forefront travelling carrier 1 stopping and waiting around the exit side of the work area WA from the ground-based wide-range optical communication devices 18a and 18b around the exit side of the work area WA. Thus, the movement permission signal is transmitted to the rear travelling carrier 1Z and all of the travelling carriers 1 stopping and waiting within the work area WA, and the movement at the operating speed VL is resumed. On the occasion when a time delay from the time when the rear travelling carrier 1Z completes being docked with the stopping and waiting front travelling carrier 1Y to the time when all of the travelling carriers 1 within the work area WA including the front travelling carrier 1Y start moving at the operating speed VL is long, the rear travelling carrier 1Z may be controlled so as to stop temporarily during the period until the movement permission signal is sent from the front travelling carrier 1Y to the rear travelling carrier 1Z.

Figure 9:
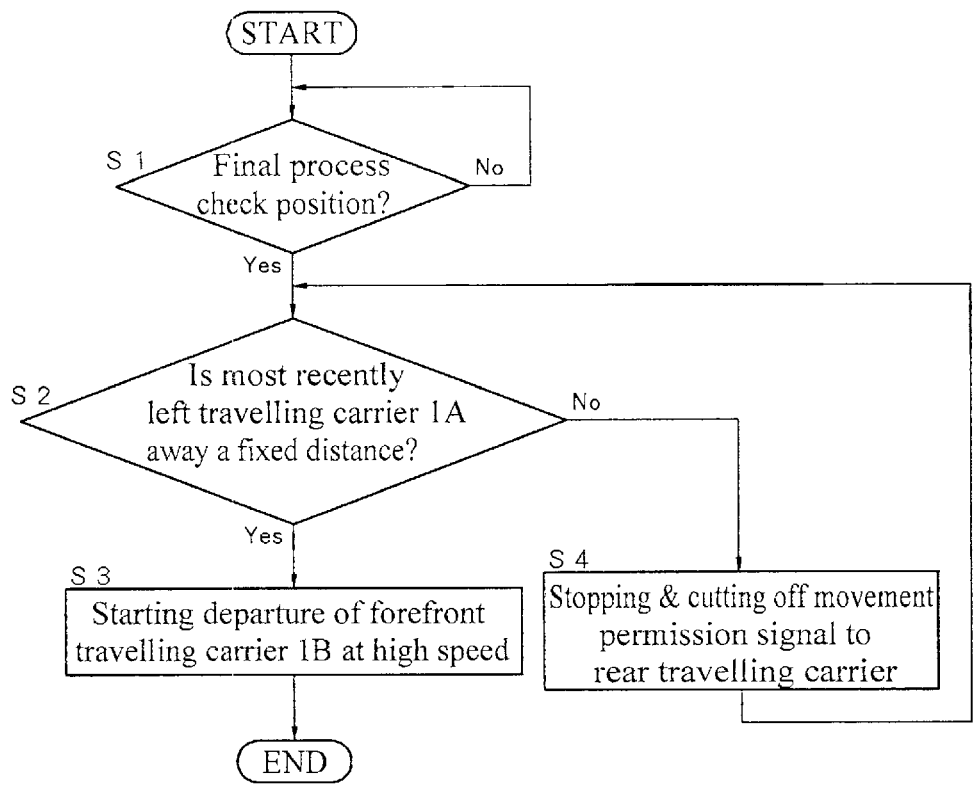
FIG. 9 is a flow chart explaining the control when the forefront travelling carrier is let out from the work area.

Next, movement control over the travelling carrier 1 at the time of leaving the work area WA will be described based on FIGS. 5B to 6, FIG. 9, and FIG. 10. As shown in FIG. 5B, a travelling carrier 1 most recently having left the work area WA and moving at a high speed VH is referred to as a most recently left travelling carrier 1A, and a travelling carrier 1 located at the final process check position P4 of the work area WA is referred to as a forefront travelling carrier 1B, and a travelling carrier 1 located at the check position before the final process P3 of the work area WA is referred to as a second travelling carrier 1C. When the forefront travelling carrier 1B reaches the final process check position P4 (FIG. 9—S1), this information is transmitted to the ground-based control device from the wide-range optical communication device 15 of the forefront travelling carrier 1B via the ground-based wide-range optical communication devices 18a and 18b. The ground-based control device makes a determination whether the most recently left travelling carrier 1A at that moment is within the range of a fixed safety distance D2, with respect to the forefront travelling carrier 1B. If the most recently left travelling carrier 1A is already away forward from the range of the fixed safety distance D2 (FIG. 9—S2), the sending of the movement permission signal from the ground-based wide-range optical communication devices 18a and 18b is continued. Thus, the control device 19 of the forefront travelling carrier 1B controls to accelerate the motors 6 based on reaching the final process check position P4 and receiving the movement permission signal, and lets the forefront travelling carrier 1B out of the work area WA at a high speed VH (FIG. 9—S3).

When determining that the most recently left travelling carrier 1A is within the fixed safety distance D2 as shown by virtual lines in FIG. 5B, the ground-based control device stops the sending of the movement permission signal from the ground-based wide-range optical communication devices 18a and 18b. Therefore, the relay transmission of the movement permission signal as described above is suspended, and all of the travelling carriers 1 within the work area WA including the forefront travelling carrier 1B come to a stop and wait on the spot (FIG. 9—S4). The foregoing control is executed after the most recently left travelling carrier 1A advances forward from the fixed safety distance D2, and then the forefront travelling carrier 1B leaves the work area WA at a high speed VH, and at the same time, the second travelling carrier 1C and all of its following travelling carriers 1 within the work area WA start moving at the operating speed VL again. The forefront travelling carrier 1B leaving the work area WA at a high speed VH is applied also with the normal deceleration and stop control based on the obstacle detection by the obstacle sensor 12 since the deceleration and stop control program based on the obstacle detection by the obstacle sensor 12 having been invalidated before the forefront travelling carrier 1B enters the work area WA is returned to be valid before the forefront travelling carrier 1B reaches the final process check position P4 as will be described later.

Figure 10:
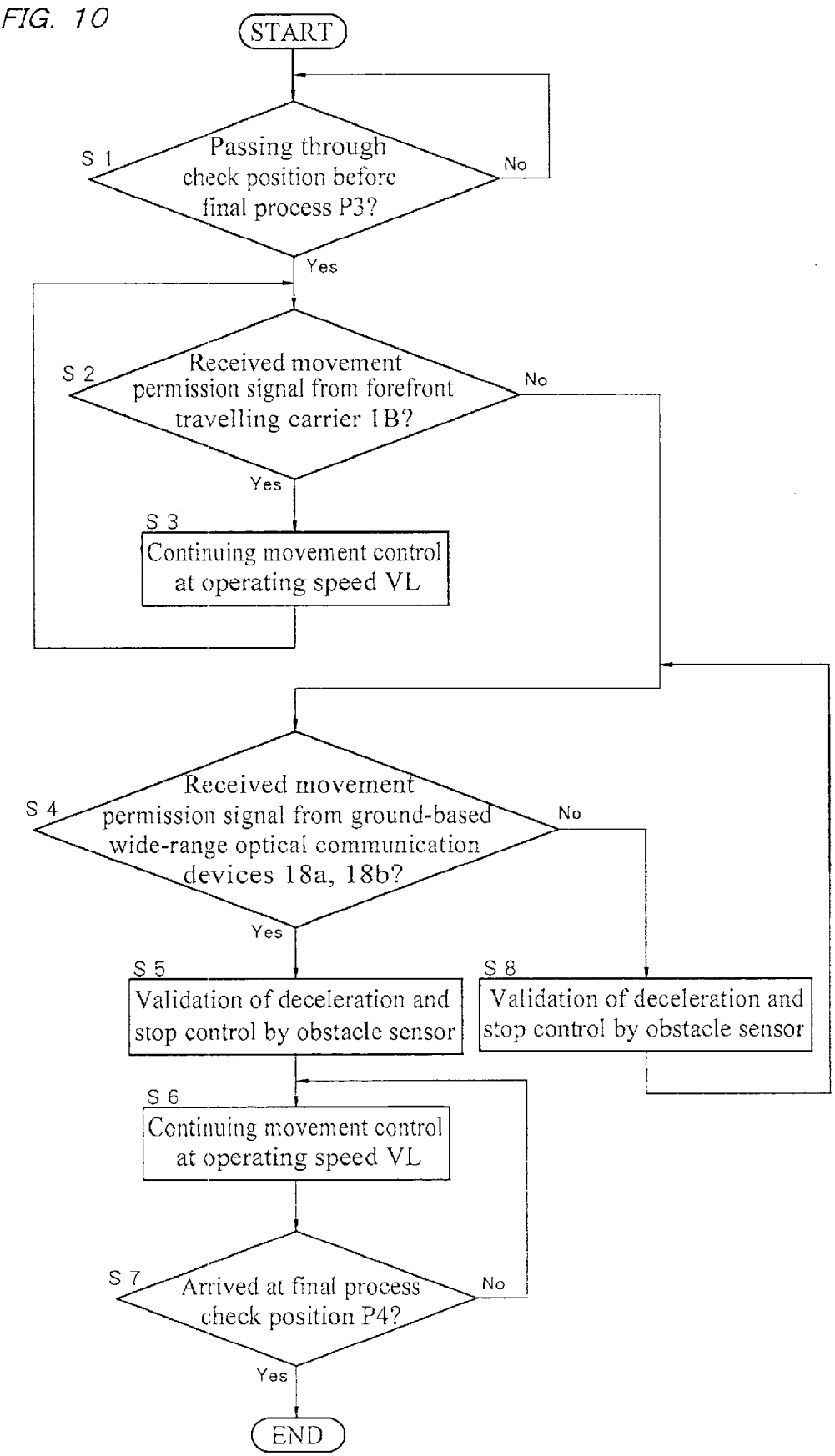
FIG. 10 is a flow chart explaining the control over the second travelling carrier following the forefront travelling carrier in the work area.

When passing through the check position before the final process P3 (FIG. 10—S1), on the other hand, the second travelling carrier 1C already receives the movement permission signal from the forefront travelling carrier 1B passing through the final process check position P4 via the optical communication devices 13 and 14 (FIG. 10—S2). Therefore, the second travelling carrier 1C continues to move at the operating speed VL (FIG. 10—S3). On the occasion when the forefront travelling carrier 1B leaves the final process check position P4 and moves to leave the work area WA at a high speed VH through the foregoing action and when the following distance between the forefront travelling carrier 1B and the second travelling carrier 1C becomes larger than what the data communication by the optical communication devices 13 and 14 is available, the second travelling carrier 1C becomes unable to take over the movement permission signal from the forefront travelling carrier 1B via the front and rear optical communication devices 13 and 14. However, on condition that the second travelling carrier 1C between the check position before the final process P3 and the final process check position P4 has received the movement permission signal from the ground-based wide-range optical communication devices 18a and 18b via the wide-range optical communication device 15 (FIG. 10—S4), the movement at the operating speed VL can be continued (FIG. 10—S6) until reaching the final process check position P4 (FIG. 10—S7). Due to that the second travelling carrier 1C has received the movement permission signal from the ground-based wide-range optical communication devices 18a and 18b, the relay transmission of the movement permission signal to all of the travelling carriers 1 within the work area WA continuing rearward from the second travelling carrier 1C is also continued, and all of the travelling carriers 1 within the work area WA also follow the second travelling carrier 1C and move at the operating speed VL.

The deceleration and stop control program based on the obstacle detection by the obstacle sensor 12 of each travelling carrier 1 having been invalidated before entering into the work area WA is validated at the time when the second travelling carrier 1C having passed through the check position before the final process P3 shifts from the movement based on the movement permission signal from the forefront travelling carrier 1B to the stage of continuing the movement only based on the movement permission signal from the ground-based wide-range optical communication devices 18a and 18b (FIG. 10—S5). Accordingly, the deceleration and stop control based on the obstacle detection by the obstacle sensor 12 is used together for the second travelling carrier 1C having passed through the check position before the final process P3 after the forefront travelling carrier 1B leaving the work area WA at a high speed VH is away forward and the second travelling carrier 1C comes to receive no movement permission signal. If the forefront travelling carrier 1B having started departing the final process check position P4 with speed is stopped for some reason at a position which can be detected by the obstacle sensor 12 of the second travelling carrier 1C before reaching the final process check position P4, as shown in FIG. 6, the second travelling carrier 1C is stopped on the spot by the action of the normal deceleration and stop control program based on the obstacle detection by the obstacle sensor 12, and at the same time, the relay transmission of the movement permission signal to the following travelling carrier 1 is also stopped. Thus, all of the travelling carriers 1 within the work area WA with the second travelling carrier 1C at the forefront result in stopping and waiting on the spot until the movement at a high speed VH of the abnormally stopped forefront travelling carrier 1B is resumed.

On the occasion when the sending of the movement permission signal from the ground-based wide-range optical communication devices 18a and 18b is cut off by the action of the ground-based control device, the second travelling carrier 1C having passed through the check position before the final process P3 stops on the spot, and the relay transmission of the movement permission signal to the following travelling carrier 1 is also cut off. Therefore, all of the travelling carriers 1 within the work area WA with the second travelling carrier 1C at the forefront come to a stop and wait on the spot until the sending of the movement permission signal from the ground-based wide-range optical communication devices 18a and 18b is resumed (FIG. 10—S8).

The above movement control makes it possible that the travelling carrier 1 moving at a high speed is automatically controlled to decelerate and then entered into the work area WA, that all of the travelling carriers 1 are driven at the fixed operating speed VL in the continuous state of adjoining each other within the work area WA, and that each travelling carrier 1 having reached the exit of the work area WA is automatically controlled to accelerate and then let out at a high speed VH.

INDUSTRIAL APPLICABILITY

The method for controlling movement of travelling carriers of the present invention can be utilized as a method for controlling movement on the occasion when self-propelled travelling carriers loaded with vehicle bodies are driven at a fixed operating speed while maintaining the continuous state at a fixed work area in an automobile assembly line.

What is claimed is:

1. A method for controlling movement of travelling carriers in conveying equipment where variable-moving-speed, self-propelled travelling carriers move on their own at a fixed low operating speed in a work area within a moving path for the travelling carriers while maintaining continuous motion in a moving direction and where travelling carriers approach the work area at a high speed, the method comprising:
providing each of the travelling carriers with data communication means to perform data communication between front and rear adjacent travelling carriers;
setting a measurement starting point upstream of the work area in the moving path;
providing a control device installed in each travelling carrier operable to calculate a current location information of an associated travelling carrier corresponding to a moving distance from the measurement starting point;
the front travelling carrier transmitting a current location information of the front travelling carrier to the control device of the adjacent rear travelling carrier via the data communication means;
the control device of the rear travelling carrier calculating a following distance between the front and rear travelling carriers based on a current location information of the rear travelling carrier and the current location information of the front travelling carrier received from the front travelling carrier via the data communication means;
the control device of the rear travelling carrier performing a deceleration control based on decremental changes of the calculated following distance between the front and rear travelling carriers until the following distance reaches a set value; and
each of the travelling carriers being self-propelled at the operating speed and entering into the work area by means of the control device installed in each travelling carriers.

2. The method for controlling movement of travelling carriers according to claim 1, further comprising:
the rear travelling carrier terminating speed control after a docking completion based on the following distance between the front and rear travelling carriers; and
all of the travelling carriers moving within the work area on their own at the operating speed without coupling to each other.

3. The method for controlling movement of travelling carriers according to claim 1, wherein the data communication means comprise optical communication means using a photo transmitter-receiver.

4. The method for controlling movement of travelling carriers according to claim 1, further comprising:
providing each of the travelling carriers with an obstacle sensor for detecting an obstacle ahead; and
the rear travelling carrier performing deceleration control based on decremental changes of the following distance between the front and rear travelling carriers from a time when the rear travelling carrier approaching the work area at a high speed detects the front travelling carrier by the obstacle sensor.

5. The method for controlling movement of travelling carriers according to claim 2, wherein the data communication means comprise optical communication means using a photo transmitter-receiver.

6. The method for controlling movement of travelling carriers according to claim 2, further comprising:
providing each of the travelling carriers with an obstacle sensor for detecting an obstacle ahead; and
the rear travelling carrier performing deceleration control based on decremental changes of the following distance between the front and rear travelling carriers from a time when the rear travelling carrier approaching the work area at a high speed detects the front travelling carrier by the obstacle sensor.

* * * * *

UNITED STATES PATENT AND TRADEMARK OFFICE
CERTIFICATE OF CORRECTION

PATENT NO. : 8,825,205 B2  
APPLICATION NO. : 13/923107  
DATED : September 2, 2014  
INVENTOR(S) : Toshiaki Yokota et al.

Page 1 of 1

It is certified that error appears in the above-identified patent and that said Letters Patent is hereby corrected as shown below:

On the title page, item (63) Related U.S. Application Data should read:

Continuation of application No. PCT/JP2012/051835 filed on Jan. 27, 2012.

Signed and Sealed this
Twenty-third Day of December, 2014

Michelle K. Lee
*Deputy Director of the United States Patent and Trademark Office*